United States Patent

Engle

Patent Number: 5,083,843
Date of Patent: Jan. 28, 1992

[54] AUTOMATIC GRADUATED/DIRECT RELEASE VALVE

[75] Inventor: Thomas H. Engle, Cape Vincent, N.Y.

[73] Assignee: Knorr Brake Holding Corporation, Westminster, Md.

[21] Appl. No.: 569,426

[22] Filed: Aug. 20, 1990

[51] Int. Cl.⁵ .............................................. B60T 15/24
[52] U.S. Cl. ........................................ 303/74; 303/36
[58] Field of Search ................................... 303/36–39, 303/72–74, 77–79, 25, 27, 26, 29

[56] References Cited

U.S. PATENT DOCUMENTS

| | | | |
|---|---|---|---|
| 2,812,986 | 11/1957 | Jeffrey et al. | 303/74 X |
| 2,861,843 | 11/1958 | Bentz et al. | 303/26 |
| 2,955,882 | 10/1960 | Juhlin | 303/74 X |
| 3,232,678 | 2/1966 | Wilson | 303/80 |
| 3,429,620 | 2/1969 | Scott | 303/74 |
| 3,716,276 | 2/1973 | Wilson et al. | 303/82 |
| 4,033,632 | 7/1977 | Wilson | 303/74 |
| 4,067,624 | 1/1978 | McEathron | 303/69 |
| 4,106,819 | 8/1978 | Hart | 303/38 |
| 4,125,292 | 11/1978 | Worbois et al. | 303/74 X |
| 4,188,071 | 2/1980 | Hart | 303/33 |
| 4,558,907 | 12/1985 | Reiss et al. | 303/74 |
| 4,775,194 | 10/1988 | Vaughn et al. | 303/74 |

FOREIGN PATENT DOCUMENTS 1122092  1/1962  Fed. Rep. of Germany ........ 303/29

Primary Examiner—Robert J. Oberleitner
Assistant Examiner—Alfred Muratori
Attorney, Agent, or Firm—Barnes & Thornburg

[57] ABSTRACT

A graduated release device which includes a valve, for example a check valve, connecting a control valve port and a brake cylinder port which prevents flow from the brake cylinder port to the control valve port. A graduating section controls the valve to produce graduated release of the brake cylinder in response to pressure on the brake cylinder port, brake pipe port and graduating volume port. An automatic mode section controls the valve to produce direct release of the brake cylinder in response to less than a predetermined value of pressure on the supply line port. If it is a two pipe system which includes graduated release, an appropriate pressure will appear on the supply line port and therefore allow the valve to be controlled by the graduating section. If less than a predetermined pressure is on the supply line port indicating that it is a single pipe system, the mode selecting section maintains the valve open such that it operates as a direct release valve between the control valve port and the brake cylinder port.

23 Claims, 1 Drawing Sheet

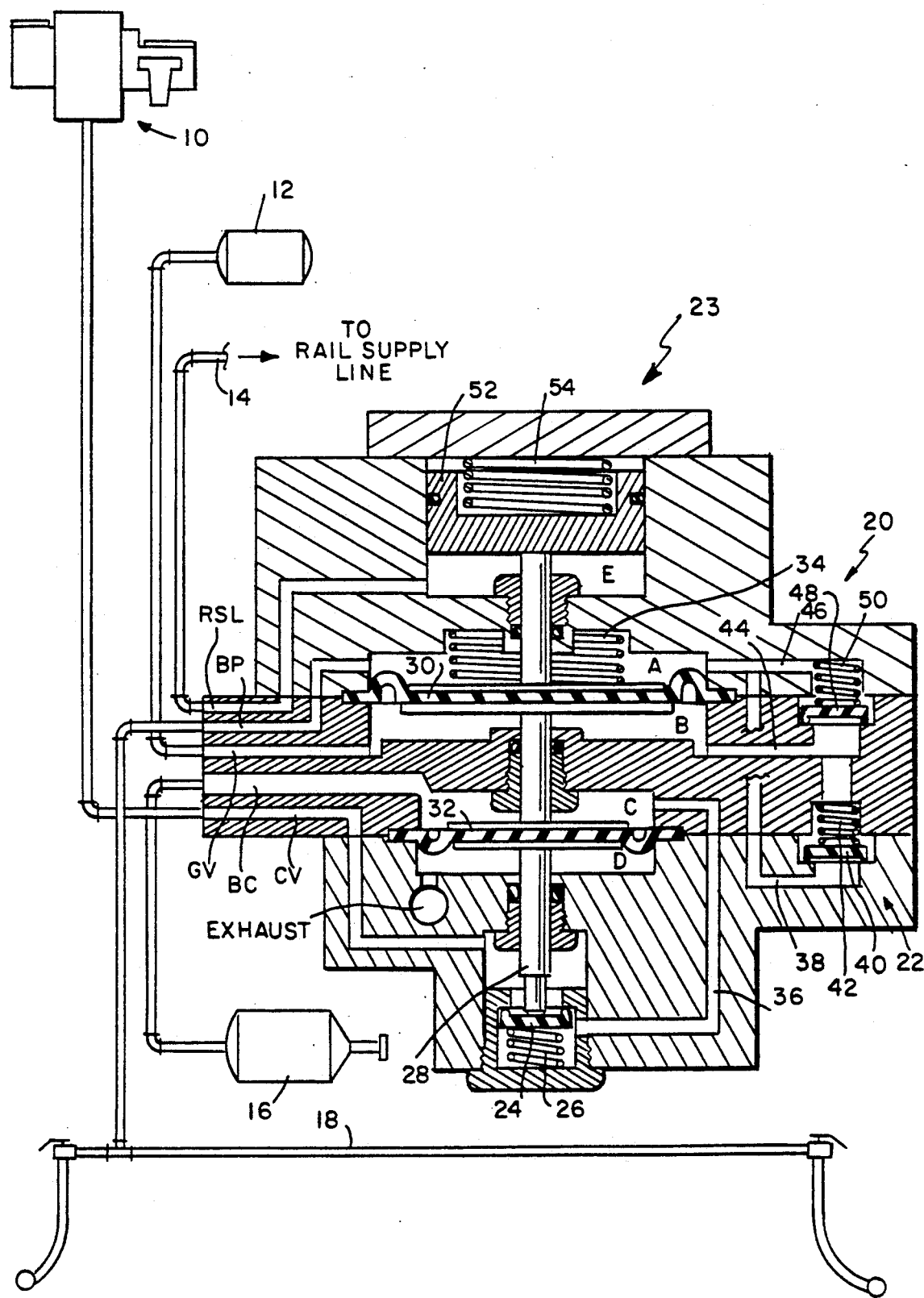

AUTOMATIC GRADUATED/DIRECT RELEASE VALVE

BACKGROUND AND SUMMARY OF THE INVENTION

The present invention relates generally to pneumatically operated graduating release valve devices for railroad vehicles and more specifically to an improved graduated release valve which is capable of operating in the graduated release or the direct release mode.

Graduating release brake control devices currently being used on passenger rail vehicles are of the general type known as 26-C. Direct release brake control devices, however, have been used on freight rail vehicles to provide improved responsiveness during brake application mode and freedom from sticking brakes on long trains during the release mode. Such a brake control device is generally known as an ABDW brake control device for freight vehicles, which is of the type generally disclosed in the Wilson U.S. Pat. No. 3,232,678, representing the well known ABD valve device, combined with a continuous quick service portion as disclosed in the Wilson U.S. Pat. No. 3,716,276.

Freight cars in the western hemisphere generally include a single pipe AAR-type direct release valve. This is in contrast to the two pipe, graduated release valve systems for passenger trains in the U.S. which include a two pipe system, namely generally a brake pipe and a rail supply pipe. UIC-type equipment, which is also freight equipment, is equipped with a two pipe, graduated release system. The UIC systems for freight generally do not include greater than 50 cars and therefore the ability to use graduated release is not detrimental.

The desirability of using the advantages of the ABDW freight control valve on passenger trains with a graduated release brake control device is described in U.S. Pat. No. 4,775,194 to Vaughn, et al. The graduated release valve is governed generally by the brake cylinder pressure, brake cylinder exhaust passage pressure from the ABDW control valve and brake pipe pressure, to at times, modify the output of the control valve device to provide for graduated control of the passenger railroad vehicles brakes. The ability to switch between direct release and graduated release is produced by manually changing a specific fluid connection 85 on the graduated release valve. Another example is U.S. Pat. No. 4,033,632 to Wilson wherein valve cover 15 is removed and gasket 15a is rotated to adjust between direct and graduated release. This similar adjustment is provided on the 26F control valve in prior art brake systems.

The mixing and matching of freight cars in various systems throughout the world including freight cars with the AAR single pipe system and freight cars with the UIC double pipe system is occurring more frequently. One cannot always guarantee that the manual adjustment from a direct release to a graduated release has been effected in the yard. Freight trains were generally designed for long trains and therefore have direct release. Thus freight train car brakes cannot be used in short trains with UIC style two pipe, graduated release freight systems.

Another piece of rail equipment which includes a two pipe system is the road railer. This is a vehicle which is equipped to run on rails as well as on the road. The rail supply line is used for the rail brakes and the highway supply line is used for the highway brake system. Thus there exists the desirability of incorporating these types of vehicles within a train capable of operating in a direct release and a graduated release train system.

Thus it is an object of the present invention to provide an improved graduated release valve for rail vehicles.

Another object of the present invention is to provide a graduated release valve for rail vehicles which automatically selects between the direct release mode and the graduated release mode.

These and other objects are achieved by providing a graduated release valve which includes control valve port, brake cylinder port, brake pipe port, graduated volume port and a supply line port. A valve, for example a graduating check valve, is provided connecting the control valve port and the brake cylinder port which prevents flow from the brake cylinder port to the control valve port. A graduating section controls the valve to produce graduated release of the brake cylinder in response to pressure on the brake cylinder port, brake pipe port and graduated volume port. An automatic mode section controls the valve to produce direct release of the brake cylinder in response to less than a predetermined value of pressure on the supply line port. If it is a two pipe system which includes graduated release, an appropriate pressure will appear on the supply line port and therefore allow the valve to be controlled by the graduating section. If less than a predetermined pressure is on the supply line port indicating that it is a single pipe system, the mode selecting section maintains the valve open such that it operates as a direct release valve between the control valve port and the brake cylinder port.

The valve includes a stem which is operated on by the graduating section and the mode section to control the operation of the valve. The mode section includes a pressure member cooperating with the stem and a spring for defining the predetermined pressure and biasing the pressure member to move the stem to open the graduated check valve. A pressure chamber is connected to the supply line port, moving the pressure member in response to the predetermined pressure on the supply line port to prevent cooperating between the pressure member and the stem such that the stem can be operated by the graduating section. Preferably the predetermined pressure is in the range of 50 psi or greater.

The graduating section includes a brake cylinder pressure chamber connected to the brake cylinder port for moving the stem to open the graduating check valve. A brake pipe pressure chamber is provided connected to the brake pipe port for moving the stem to open the graduating check valve. A graduating volume pressure chamber is provided connected to the graduating volume port moving the stem to close the graduating check valve. A first diaphragm is connected to the stem between the brake pipe and the graduating volume pressure chamber and a second diaphragm is connected to the stem between the brake cylinder pressure chamber and an exhaust pressure chamber. The first diaphragm's area is two and one half times the second diaphragm's area. A spring is provided in the brake pipe pressure chamber for moving the stem to open the graduating check valve at 5 psi. This assures direct release of the brake when the pressure in the brake pipe is below 5 psi.

A charging check valve is provided between the brake pipe and the brake cylinder pressure chambers for charging the graduating volume from the brake pipe. An overcharge check valve is provided between the brake pipe and the brake cylinder pressure chambers for discharging the graduating volume into the brake pipe. The overcharge check valve includes a spring biasing the overcharged check loads for pressure differentials of less than 30 psi. This prevents discharging of the graduating volume during the early stages of brake application.

Other objects, advantages and novel features of the present invention will become apparent from the following detailed description of the invention when considered in conjunction with the accompanying drawings.

BRIEF DESCRIPTION OF THE DRAWING

The FIGURE shows a cross-sectional view of a mode selecting, graduated release device incorporating the principles of the present invention in combination with a rail vehicle braking system.

DETAILED DESCRIPTION OF THE DRAWING

A rail vehicle braking system includes a control valve 10, a graduated volume 12, a rail supply line 14, a brake cylinder 16 and a brake pipe 18, all connected to a graduated release device 20. The control valve 10 is connected to port CV, the graduated volume 12 is connected to port GV, the rail supply line is connected to port RSL, the brake cylinder 16 is connected to port BC and the brake pipe 18 is connected to port BP of the graduated release device 20. The graduated release device 20 includes a graduated release valve section 22 and a mode control section 23.

The graduated release section 22 includes a graduating check valve 24 connected between the control valve port CV and the brake cylinder port BC and spring bias closed by a spring 26 to prevent flow from the brake cylinder port BC to the control valve port CV. The value of spring 26 is equivalent to produce less than one half psi on check valve 24, to maintain the valve adjacent its seat. A stem 28 engages the graduating check valve 24 and controls the graduated operation of the check valve to allow flow between the control valve port CV and the brake cylinder port BC irrespective of the direction of flow.

The graduated release control of the stem 28 includes a brake pipe pressure chamber A connected to the brake pipe port BP for moving the stem 28 to open the graduating check valve 24. It also includes a graduating volume pressure chamber B connected to the graduating volume port GV for moving the stem 28 to close the graduating check valve 24. Finally, a brake cylinder pressure chamber C is provided connected to the brake cylinder port BC for moving the stem 28 to open the graduating check valve 24. The brake cylinder pressure chamber C is connected via passage 36 to the graduating check valve 24. An upper diaphragm 30 separates the brake pipe pressure chamber A from the graduated volume pressure chamber B. A lower diaphragm 32 separates the brake cylinder pressure chamber C from an exhaust chamber D on the other side of the diaphragm 32. As can be noted from the FIGURE, the area of the upper diaphragm 30 is two and one half times the area of the lower diaphragm 32 as will be explained below.

A spring 34 is provided in the brake pipe pressure chamber A moving the stem 28 to open the graduating check valve 24. The spring 34 is in the range of the equivalent of 5 psi on diaphragm 30. As will be explained below, this opens graduating check valve 24 when the brake pipe is below 5 psi such that the system operates as a direct release.

The brake pipe pressure chamber A is connected via passage 38, charging check valve 40 having spring 42 and passage 44 to the graduated volume pressure chamber B. Spring 42 has a nominal value of less than the equivalent of one half psi on valve 40 to maintain the valve adjacent its seat. The brake pipe pressure chamber A is also connected to the graduated volume pressure chamber B via passage 46, over charged check valve 48 having spring 50 and passage 44. Spring 50 is selected to be below the equivalent of 30 psi and preferably 20 psi on valve 48 so as to maintain the graduated volume pressure below 30 psi above the brake pipe pressure.

Mode control section 23 includes a railroad supply pressure chamber E connected to rail supply line port RSL and a pressure member or piston 52 slidable within the railroad supply pressure chamber E. A spring 54 biases the piston 52 down and into engagement with the stem 28. The spring 54 is in the range of the equivalent of 50 psi on piston 52. When a railroad supply line is connected to the rail supply line port RSL, the pressure in pressure chamber E will rise acting against the spring 54 and removing the piston 52 from engagement with the stem 28. This will allow the stem 28 to be operated by the pressure chambers A, B and C and spring 34. This allows the graduated release device 20 to operate as a graduated release device. If there is no pressure or the pressure on the rail supply line port RSL is below the predetermined pressure set by spring 54, spring 54 pushes the piston 52 down and into engagement with the stem 28 forcing the graduating check valve 24 to be open. This provides continuous connection between the control valve port CV and the brake cylinder port BC such that the device operates as a direct release device.

The operation of the graduated release valve will now be described

CHARGING

When the brake pipe 18 is initially charged, brake pipe air flow from brake pipe port BP into Chamber A above the graduating valve's upper diaphragm 30. Since the diaphragm 30 is held in its downward or release position by both brake pipe pressure and the biasing spring 34, brake pipe air will flow through chamber A, atop the upper diaphragm 30, through passage 38 past charging check valve 40, through passage 44 to chamber B beneath the upper diaphragm 30 to graduating volume port GV and to the graduating volume 12. Since there is no air in the brake cylinder 16 or brake cylinder line during charging, there is no pressure on either side of the lower diaphragm 32. Charging continues until brake pipe 18 and graduating volume 12 are both fully charged and charging check valve 40 closes. Since diaphragm 32 is balanced and pressure in chambers A and B are equal, spring 34 maintains the upper diaphragm 30 down to maintain the graduating check valve 24 open.

SERVICE BRAKE APPLICATION

During a service brake application, brake pipe pressure is reduced causing the control valve 10 to supply brake cylinder pressure in response to the reduction.

Brake cylinder air flows from the control valve 10 through port CV, through open graduating check valve 24, through passage 36 into chamber C on top of the lower diaphragm 32 to the brake cylinder 16. As the brake application continues, brake pipe pressure continues to fall; and brake cylinder pressure continues to rise in the ratio of 2½ psi brake cylinder pressure increase for each 1 psi brake pipe pressure decrease.

As brake pipe pressure falls, graduating volume pressure is prevented from returning to brake pipe by charging check valve 40. Overcharge check valve 48, which would permit such return, is biased closed by the biasing spring 50, to prevent discharge of graduating reservoir pressure during the early stages of brake application. As the brakes are applied, a differential force is built up across the upper diaphragm 30 of the graduating valve by the retained high pressure in the graduating volume 12. This force attempts to move the stem 28 upward against the biasing spring 34 and the now reduced brake pipe pressure. The stem 28 will not move up, however, because as the upward force is being applied on the upper diaphragm 30, a downward force is simultaneously being applied on the small lower diaphragm 32 by the buildup of brake cylinder pressure in chamber C. Note that the ratio of areas of the two diaphragms is 2½ to 1, exactly the same as the ratio of the build up of brake cylinder pressure to the reduction of brake pipe pressure.

Thus, during brake application, the graduating section 22 remains in its downward position essentially balanced, with the graduating check valve 24 held open and off its seat. It is, however, not critical that this be the case. Momentary fluctuations of the stem 28 into its upward position would have no effect on the buildup of brake cylinder pressure because in the upper position, graduating check valve 24 does not prevent the passage of air from the control valve 10 to the brake cylinder 16. It simply acts as a check to prevent backflow during release.

GRADUATED RELEASE

When a graduated release of brake cylinder pressure is required, brake pipe pressure is partially restored by operation of the locomotive brake valve. The control valve 10 will move to its full release position; and brake cylinder pressure will begin to reduce rapidly through open graduating check valve 24, port CV and the release control valve 10. This reduction of brake cylinder pressure will reduce the downward force exerted on the lower diaphragm 32 by brake cylinder air in chamber C, allowing the graduating volume air in chamber B, still at brake pipe full release value, to move the stem 28 upward, permitting the graduating check valve 24 to seat or close. Thus, air will be retained in the brake cylinder 16 at a value in accord with the remaining brake pipe reduction. That is to say at a value proportional to the difference between the present value of brake pipe pressure and its maximum or release value. With graduating check valve 24 thus seated, further exhaust of brake cylinder air will be prevented and the valve will assume its steady state or retain position.

A further increase or partial restoration of brake pipe pressure will again move the stem 28 downward, unseating graduating check valve 24 and permitting a further reduction in brake cylinder pressure until this pressure, as reflected in chamber C, again permits the graduating volume pressure to move the stem 28 upward to the closed or retain position. Thus, brake cylinder pressure will be reduced in mathematically correct proportion to brake pipe pressure increase, no matter how slowly or quickly this increase takes place. Finally, when brake pipe is restored to a pressure 5 psi or the value of spring 34 below the pressure in the graduating volume, the biasing spring 34 will completely balance the remaining pressure differential of graduating volume over brake pipe pressure. This opens or unseats the graduating check valve 24 and permits full release of brake cylinder when brake pipe is restored to within 5 psi of its original or release value. This assures that as long as brake pipe pressure is restored to within 5 psi of its initial value, the graduating check valve 24 will remain open in the release position and a full and complete release of brake cylinder pressure will take place. Thus, biasing spring 34 provides a release insuring feature at minimum cost.

REDUCTION OF GRADUATING VOLUME OVERCHARGE

When a locomotive is first coupled to a train of cars which were previously charged from an independent service, such as a different locomotive, the locomotive may not have the same brake pipe setting as was used when the cars were charged. Such a group of cars would normally be standing with no air in the brake pipe, brakes applied in emergency and reservoirs charged to a value equal to brake cylinder pressure. If such cars were equipped with the graduating system but were not in emergency, the graduating reservoir might still be at the higher release pressure value of the independent source. Thus, when brakes are released by the new locomotive, the brake pipe pressure restoration required to cause release of the brakes might not reach to within 5 psi (or the capacity of spring 34) of the value initially established in the graduating volume 12. In such a case, some pressure would be retained in the brake cylinder after full release was called for by the engineer; and if the train were to move, a dragging brake could result. To prevent this, it is only necessary to make certain that a brake pipe reduction of at least 30 psi is made prior to releasing brakes when locomotives have been changed. This practice is required by railways when changing locomotives in order to prevent auxiliary reservoir overcharge in any case. When this is done, the differential of graduating volume pressure over brake pipe pressure will exceed 20 psi, which is the biasing value of the spring 50 and when exceeded, the overcharge check valve 48 will open; and pressure will be drawn out of the graduating volume 12. The graduating volume pressure will remain at 20 psi above brake pipe during this operation, so when the brake pipe pressure is restored (by 30 psi) to release brakes, the new value of release pressure will be established in the graduating volume.

EMERGENCY BRAKING

When the brake pipe is vented in emergency, the graduating volume 12 will only retain 20 psi. Thus, restoration of brake pipe pressure will re-establish the correct graduating volume pressure under this circumstance also. No graduated release after emergency application will be obtained. But as the train is always brought to a standstill by such an application, the graduated release feature is not required.

The control valve 10 may be an ABE valve. Other types of control valves are K, AB, ABD, ABDW, ABDX, DB60 and other direct release types of control valves. As all of these must have brake cylinder ports and the valve only acts on the output of this port. No changes in the embodiment are required to work with one or another of the direct release control valves.

Automatic signalling through the supply line that a graduated release is required, while available on most passenger trains through the medium of either a supply pipe or train air signal pipe, will not always be available. In particular cases where it is not, some other source would have to be manually ported to the rail supply line port, but this constitutes manual rather than the preferred automatic conditioning of the valve for direct or graduated release.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A graduated release valve for a rail vehicle, which vehicle includes a control valve, a brake cylinder, a brake pipe, a graduating volume and a supply line, comprising:
   a control valve port, a brake cylinder port, a brake pipe port, a graduating volume port and a supply line port;
   valve means for connecting said control valve port and said brake cylinder port;
   graduating means for controlling said valve means to produce graduated release of said brake cylinder in response to pressures on said brake cylinder port, brake pipe port, and graduating volume port; and
   mode means for controlling said valve means to produce direct release of said brake cylinder in response to less than a predetermined value of pressure on said supply line port.

2. A graduated release valve according to claim 1 wherein:
   said valve means includes a stem;
   said graduating means controls said stem to produce said graduated release; and
   said mode means controls said stem to produce said direct release.

3. A graduated release valve according to claim 2 wherein valve means includes a graduating check valve to prevent flow from said brake cylinder port to said control valve port except under the control of said stem.

4. A graduated release valve according to claim 3 wherein said mode means includes:
   a pressure member cooperating with said stem;
   a biasing means for defining said predetermined value of pressure and biasing said pressure member to move said stem to open said graduating check valve; and
   a mode pressure chamber connected to said supply line port for moving said pressure member in response to pressures on said supply line port greater than said predetermined value to prevent cooperation between said pressure member and said stem.

5. A graduated release valve according to claim 4 wherein said pressure member is a piston.

6. A graduated release valve according to claim 4 wherein said predetermined value of pressure is in the range of 50 psi or greater.

7. A graduated release valve according to claim 2 wherein said graduating means includes:
   a brake cylinder pressure chamber connected to said brake cylinder port for moving said stem to open said valve means;
   a brake pipe pressure chamber connected to said brake pipe port for moving said stem to open said valve means; and
   a graduating volume pressure chamber connected to said graduating volume port for moving said stem to close said valve means.

8. A graduated release valve according to claim 7 wherein said graduating means includes:
   a first diaphragm connected to said stem between said brake pipe and graduating volume pressure chambers; and
   a second diaphragm connected to said stem between said brake cylinder pressure chamber and an exhaust pressure chamber.

9. A graduated release valve according to claim 8 wherein the area of said first diaphragm is two and one half times the area of said second diaphragm.

10. A graduated release valve according to claim 7 wherein said graduating means includes a spring in said brake pipe pressure chamber for moving said stem to open said valve means.

11. A graduated release valve according to claim 10 wherein said spring in said brake pipe pressure chamber exerts a force equivalent to 5 psi in said brake pipe pressure chamber.

12. A graduated release valve according to claim 7 including:
   a charging check valve between said brake pipe and graduating volume pressure chambers for charging said graduating volume from said brake pipe; and
   an overcharge check valve between said brake pipe and graduating volume pressure chambers for discharging said graduating volume into said brake pipe.

13. A graduated release valve according to claim 12 wherein said overcharge check valve includes a spring biasing said overcharge check valve closed for pressure differentials of less than 30 psi.

14. A graduated release valve according to claim 1 including:
   a charging check valve between said brake pipe and graduating volume ports for charging said graduating volume from said brake pipe; and
   an overcharge check valve between said brake pipe and graduating volume ports for discharging said graduating volume into said brake pipe.

15. A graduated release valve according to claim 14 wherein said overcharge check valve includes a spring biasing said overcharge check valve closed for pressure differentials of less than 30 psi.

16. A graduated release valve for a rail vehicle, which vehicle includes a control valve, a brake cylinder, a brake pipe, and a graduating volume, comprising:
   a control valve port, a brake cylinder port, a brake pipe port, and a graduating volume port;
   a graduating check valve for connecting said control valve port and said brake cylinder port and preventing flow from said brake cylinder port to said control valve port; and
   graduating means including a stem for opening said graduating check valve to produce graduated release of said brake cylinder in response to pressures on said brake cylinder port, brake pipe port, and graduating volume port.

17. A graduated release valve according to claim 16 wherein said graduating means includes:
- a brake cylinder pressure chamber connected to said brake cylinder port for moving said stem to open said graduating check valve;
- a brake pipe pressure chamber connected to said brake pipe port for moving said stem to open said graduating check valve; and
- a graduating volume pressure chamber connected to said graduating volume port for moving said stem to close said graduating check valve.

18. A graduated release valve according to claim 17 wherein said graduating means includes:
- a first diaphragm connected to said stem between said brake pipe and graduating volume pressure chambers; and
- a second diaphragm connected to said stem between said brake cylinder pressure chamber and an exhaust pressure chamber.

19. A graduated release valve according to claim 18 wherein the area of said first diaphragm is two and one half times the area of said second diaphragm.

20. A graduated release valve according to claim 17 wherein said graduating means includes a spring in said brake pipe pressure chamber for moving said stem to open said graduating check valve.

21. A graduated release valve according to claim 20 wherein said spring in said brake pipe pressure chamber exerts a force equivalent to 5 psi in said brake pipe pressure chamber.

22. A graduated release valve according to claim 17 including:
- a charging check valve between said brake pipe and brake graduating volume chambers for charging said graduating volume from said brake pipe; and
- an overcharge check valve between said brake pipe and graduating volume pressure chambers for discharging said graduating volume into said brake pipe.

23. A graduated release valve according to claim 22 wherein said overcharge check valve includes a spring biasing said overcharge check valve closed for pressure differentials of less than 30 psi.

* * * * *